(No Model.)

A. P. BROWN.
COMBINED POCKET KNIFE AND CIGAR CUTTER.

No. 274,714. Patented Mar. 27, 1883.

Witnesses  Inventor

UNITED STATES PATENT OFFICE.

ADDISON P. BROWN, OF NEW YORK, N. Y.

COMBINED POCKET-KNIFE AND CIGAR-CUTTER.

SPECIFICATION forming part of Letters Patent No. 274,714, dated March 27, 1883.

Application filed June 15, 1882. (No model.)

*To all whom it may concern:*

Be it known that I, ADDISON P. BROWN, of the city of New York, in the county and State of New York, have invented a certain new and useful Combined Pocket-Knife and Cigar-Cutter, of which the following is a specification.

The cigar-cutter which I combine with a pocket-knife is composed of a receiver in which the tip of a cigar may be inserted and a blade attached to or formed on a pivoted shank or lever, which may be swung on its pivot to move the knife transversely through the said socket, and thus cut the cigar-tip.

Such cigar-cutters have been heretofore made as separate articles of manufacture; but my present invention consists in a novel combination of a handle provided with a socket for a cigar-tip at its end, a shank or lever carrying a knife and pivoted in the opposite end of the handle, and one or more knife-blades pivoted in the same end of the handle as said shank or lever and on the side or sides thereof, as fully hereinafter described.

Figure 1:
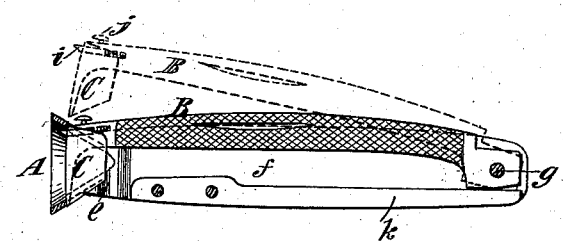
Figure 2:

In the accompanying drawings, Figure 1 represents a longitudinal section of my improved article, and Fig. 2 represents a plan thereof.

Similar letters of reference designate corresponding parts in both figures.

The knife here chosen for the purpose of illustration has two blades, $a\ a$, at one end; but the cutter may be combined with a knife having a greater or less number of blades.

$c$ designates the outer coverings of the handle, and $d$ designates the two outer cheeks or plates to which the parts $c$ are attached. The outer cheeks or plates, $d$, are continued at one end slightly beyond the handle proper, and are given a peculiar form, so that they together form a funnel-shaped socket or receiver, A, which is adapted to receive the tips of cigars, and which has a transverse opening, $e$, through it or in rear of it.

$f$ designates the two linings or plates, and between the linings or plates $f$ is a shank or lever, B, which occupies the position of a blade in the handle, and which carries at its free end a cigar-cutting blade, C, which corresponds in form to the angular contour of the opening $e$ in or at the rear of the socket A, as best shown in Fig. 2.

The cigar-cutting blade here shown is adapted to cut a V-shaped notch in the tip of a cigar; but a U-shaped blade or a blade of other form might be used.

At the end opposite the blades C the shank or lever B is secured in the handle by a pivot, $g$, which may also pass through the blades $a\ a$ and secure them in the handle.

In order to secure the shank or lever B in a closed position when the cigar-cutter is not required for use, I provide it with a catch, which may consist of a sliding spring-actuated lock or pin, $i$, inserted in the end of the shank or lever B, and adapted to engage automatically with an opening or hole in the socket A.

When it is desired to use the cigar-cutter the bolt $i$ may be moved inward by a knob or finger-piece, $j$, projecting from it, and when thus released the shank or lever may be thrown up into the position shown in dotted lines in Fig. 1 by a spring, $k$, bearing upon its pivoted end, as also shown in Fig. 1. The tip of the cigar is then inserted in the socket A and the shank or lever B is pushed down, causing the blade C to cut a piece from the tip of the cigar, which piece drops through the opening $e$, while the bolt or pin $i$ engages automatically with the hole or opening prepared for it in the socket A, and thereby holds the shank or lever and blade in their closed positions.

By my invention I provide a very convenient article, which is not materially larger than an ordinary pocket-knife with a like number of blades, and which may be produced at a less cost than could a pocket-knife having a like number and a cigar-cutter, forming two separate and independent articles.

What I claim as my invention, and desire to secure by Letters Patent, is—

As a new article of manufacture, the knife and cigar-cutter, composed of the knife-handle having its cheeks $d\ d$ prolonged to form a socket, A, at one end thereof, the lever or shank B, pivoted in the opposite end of the knife-handle, and carrying the cigar-cutting blade C, and one or more knife-blades, $a$, pivoted in the same end of the knife-handle as said lever or shank, and at the side or sides thereof, substantially as herein described.

ADDISON P. BROWN.

Witnesses:
FREDK. HAYNES,
ED. L. MORAN.